Nov. 26, 1968  J. W. DENDY  3,413,032
HOPPER TRAILER
Filed March 15, 1967

INVENTOR:
JACK W. DENDY
BY: C. W. Coffee
Atty.

Nov. 26, 1968 J. W. DENDY 3,413,032
HOPPER TRAILER
Filed March 16, 1967 2 Sheets-Sheet 2
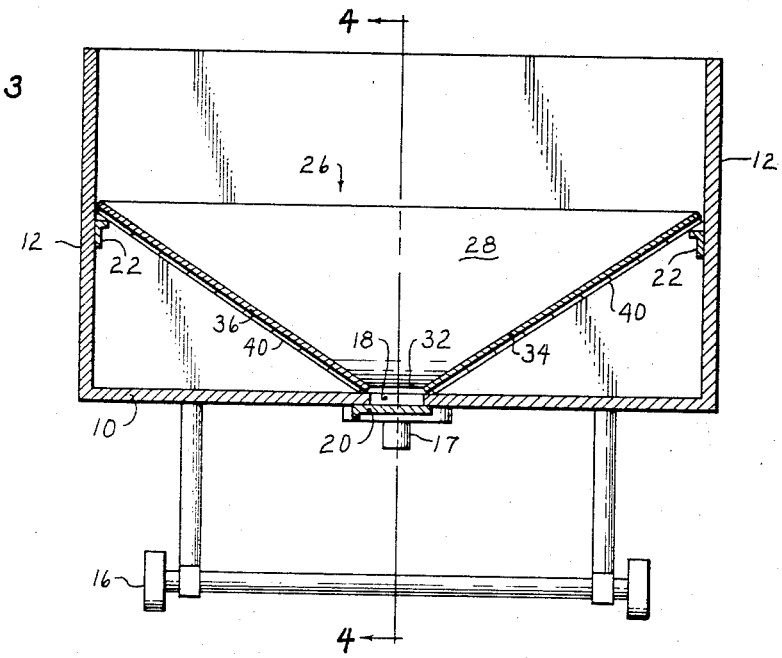
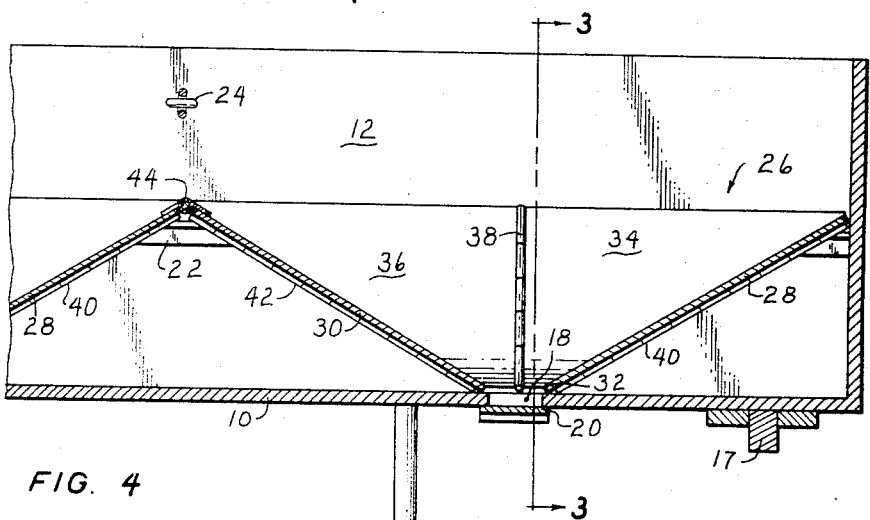
INVENTOR:
JACK W. DENDY
BY:
Atty.

United States Patent Office
3,413,032
Patented Nov. 26, 1968

3,413,032
HOPPER TRAILER
Jack W. Dendy, 208 W. 18th,
Portales, N. Mex. 88130
Filed Mar. 16, 1967, Ser. No. 623,639
2 Claims. (Cl. 298—8)

ABSTRACT OF THE DISCLOSURE

Folding funnels or a series of hoppers are placed in a trailer having an ordinary grain bed. When carrying bulk grain, the hoppers are extended. When carrying sacked grain or other cargo, the hoppers are collapsed and moved to the front of the trailer for storage.

Background of the invention

*Field of the invention.*—This invention relates to transportation and, more particularly, to trailers for hauling grain.

*Description of the prior art.*—Presently trailers are commercially on the market having a bed with a flat bottom, vertical sideboards, and open top. Some of these trailers have a plurality of doors in the bottom. The bed may be filled with grain and, to unload the grain, the doors in the bottom are opened and the grain manually moved along the flat bottom to an open door.

Also, trailers having a hopper are available on the market, but these are single purpose trailers and may not be utilized to haul sacked grain or general cargo.

One attempted combination is to provide a plurality of permanent hoppers along the bottom of the trailer. Then, in the event it is desired to haul sacked grain or other merchandise, a false floor is placed upon top of the hoppers and the load placed upon the top of the false floor. This has the disadvantage of a high center of gravity for the loaded trailer.

Summary

I have solved the problem of having a single trailer adapted to haul bulk grain and also readily converted to haul general freight and, more particularly, sacked grain. The solution is to have a plurality of hoppers or funnels, each of which is collapsible and each of which is hinged to the next adjacent one. Therefore, the hoppers are readily folded or collapsed and moved to the front of the trailer so that the trailer may be readily loaded with general cargo. Existing trailers are readily converted by installing the hoppers in them.

An object of this invention is to provide a trailer adapted to carry either a general cargo or a cargo of bulk, granular or pulverant material.

Further objects are to achieve the above with a device that is sturdy, compact, durable, simple, safe, versatile, and reliable, yet inexpensive and easy to manufacture, install, operate, and maintain.

Still further objects are to achieve the above with a method that is rapid and inexpensive and does not require skilled people to install, adjust, operate, and maintain.

The specific nature of the invention, as well as other objects, uses, and advantages thereof, will clearly appear from the following description and from the accompanying drawing, the different views of which are not necessarily to the same scale.

Description of the drawing

FIG. 3 is a sectional view of a part of the extended hoppers in the bed taken on line 3—3 of FIG. 4.

FIG. 4 is a sectional view of the extended hoppers taken on line 4—4 of FIG. 3.

Description of the preferred embodiment

Figure 1:
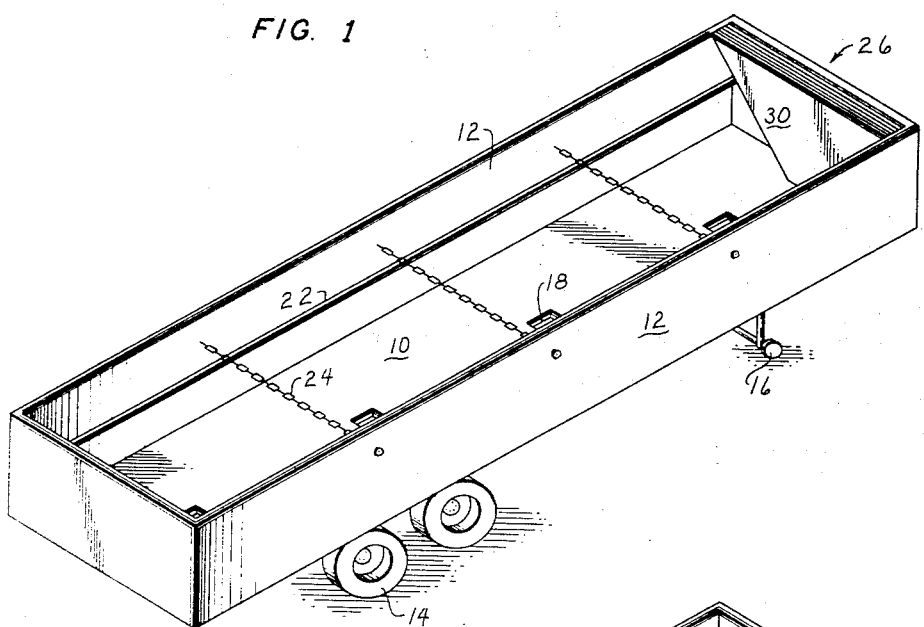
FIG. 1 is a perspective of a grain bed modified according to this invention with the hoppers folded.
Figure 2:
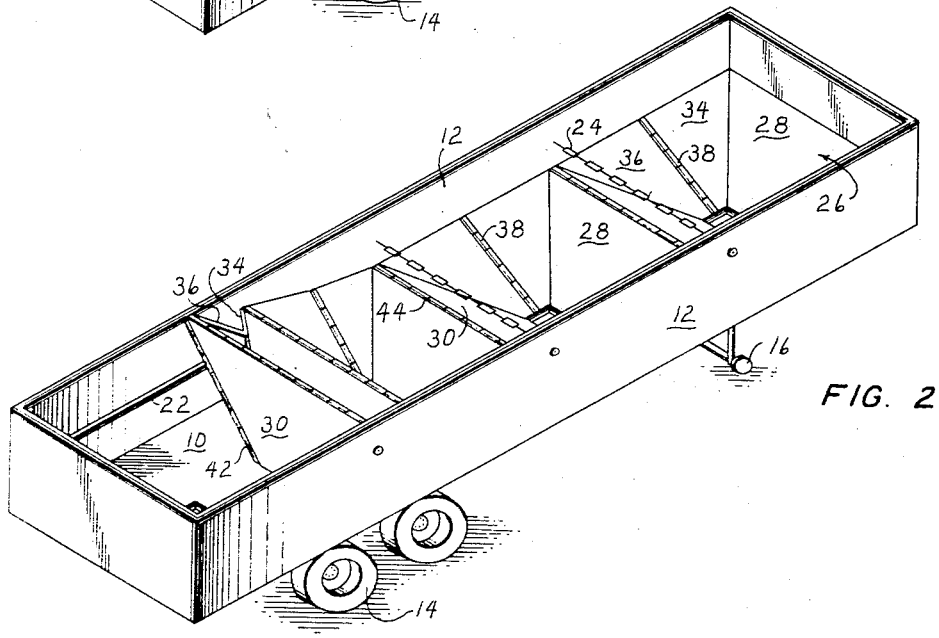
FIG. 2 is a perspective of a grain bed with the hoppers partially extended.

The invention utilizes a standard trailer having bed 10 with vertical sideboards 12. The trailer has rear wheels 14 and support structure 16 at the front to hold the front up when it is disconnected from the tractor. Fifth wheel 17 at the front of the trailer forms means for attaching it to a tractor to transport it and its load over the highway.

The bed 10 has a pluraliy of ports or doors 18 in the bottom thereof. Each of these doors has closure 20. The doors 18 and closure 20 are not further described inasmuch by common commercial practice they are found in the beds of trailers at the present time.

The trailer is modified by attaching railing 22 about half way up the inside of the sideboards 12. Tension members in the form of chains 24 extend across the top from one sideboard to the other to prevent the sideboards from spreading and thus allowing the collapsible hoppers 26 from disengaging from the railing 22.

Each hopper 26 is composed of six pieces of sheet metal. There is a front member 28 and back member 30 which are inverted triangles with the apex removed. The truncation of the apex leaves edge 32 which is equal to the width of the door 18. Front side 34 and back side 36 are hinged together along a median line by hinge 38. The front and back side together form a side member which, when flat, is the same size as the shape of the front 28 and the back 30. The two front sides 34 are hinged to either side of the front 28 by two front hinges 40. The two back sides 36 are hinged to the back member 30 by back hinges 42. This forms a truncated, inverted pyramid or funnel which is readily collapsible by folding the sides in and the front and back toward one another. There is a series of such hoppers and each of the hoppers is hinged to the next adjacent one by top hinge 44 which connects the top of the front member of one hopper to the top of the back member of the adjacent hopper.

If the trailer is to be used for general cargo, the hoppers 26 are successively folded or collapsed and moved to one end of the trailer, thus leaving the entire bed free of obstructions so that cargo may be loaded directly upon the bed 10. This results in a loaded bed having a low center of gravity with no appreciable reduction in load-carrying capacity.

If bulk grain or pulverant material is to be hauled, the series of hoppers 26 is unfolded so that each of the bottom openings at the edge 32 is registered over one of the doors 18. Thereafter, material may be loaded into the trailer. It will be noted that the top of the hopper is by no means the limit to which the material may be loaded. The material may be loaded to the top of the sideboards. To unload the material, all that is necessary is to open the closures 20 in the bed 10 and the material will flow by gravity from the trailer. It will be understood by those skilled in the art that the trailer will be positioned over a pit when the closures are opened. The material will run through the hoppers, eliminating any necessity for moving the grain to the doors.

It will be understood that there might be other embodiments within the scope of the invention. For example, the funnels could be collapsed against one sideboard by having the front and back members split and hinged along a median line and the various hoppers connected only along the edges at the two sideboards so that the hoppers are free to collapse sideways rather than endwise.

I claim as my invention:
1. In a trailer having

(a) a bed,
(b) means on the bed for attaching it to a tractor,
(c) wheels on the bed,
(d) sideboards on each side of the bed, and
(e) doors in the bottom of the bed;
(f) the improvement comprising in combination:
(g) a series of hoppers, of truncated pyramid shape, each hopper having a front, a back, and two sides, each side divided in two parts hinged together, the sides hinged to the front and back at the intersection thereof whereby each hopper may be folded flat.

2. The invention as defined in claim 1 with the additional limitation of (h) the front of one hopper hinged at the top to the back of another hopper.

References Cited

UNITED STATES PATENTS

| | | | |
|---|---|---|---|
| 244,622 | 7/1881 | Klier | 105—243 |
| 772,722 | 10/1904 | Larry | 298—24 |
| 1,104,801 | 7/1914 | Hunt | 298—24 X |
| 1,247,354 | 11/1917 | Welsh | 141—337 |
| 1,289,172 | 12/1918 | Hobson | 298—24 |
| 2,566,977 | 9/1951 | Bowlden | 298—27 |
| 3,087,759 | 4/1963 | Worster | 298—24 |

RICHARD J. JOHNSON, *Primary Examiner.*